(12) United States Patent
Aranda Gutiérrez et al.

(10) Patent No.: US 10,396,993 B2
(45) Date of Patent: Aug. 27, 2019

(54) METHOD TO ASSURE CORRECT DATA PACKET TRAVERSAL THROUGH A PARTICULAR PATH OF A NETWORK

(71) Applicant: Telefonica, S.A., Madrid (ES)

(72) Inventors: Pedro A. Aranda Gutiérrez, Madrid (ES); Diego R. Lopez, Madrid (ES); Norisy C. Orea Barrios, Madrid (ES)

(73) Assignee: Telefonica, S.A., Madrid (ES)

( * ) Notice: Subject to any disclaimer, the term of this patent is extended or adjusted under 35 U.S.C. 154(b) by 250 days.

(21) Appl. No.: 15/480,659

(22) Filed: Apr. 6, 2017

(65) Prior Publication Data
US 2017/0295021 A1 Oct. 12, 2017

(30) Foreign Application Priority Data
Apr. 7, 2016 (EP) .................................... 16382153

(51) Int. Cl.
| | |
|---|---|
| *H04L 9/32* | (2006.01) |
| *H04L 9/06* | (2006.01) |
| *H04L 12/833* | (2013.01) |
| *H04L 12/801* | (2013.01) |
| *H04L 29/06* | (2006.01) |
| *H04L 9/14* | (2006.01) |
| *H04L 12/701* | (2013.01) |

(52) U.S. Cl.
CPC .......... *H04L 9/3239* (2013.01); *H04L 9/0637* (2013.01); *H04L 9/14* (2013.01); *H04L 9/3252* (2013.01); *H04L 47/31* (2013.01); *H04L 47/34* (2013.01); *H04L 63/12* (2013.01); *H04L 45/00* (2013.01); *H04L 2209/38* (2013.01)

(58) Field of Classification Search
CPC ......... H04L 9/3239; H04L 9/14; H04L 63/12; H04L 9/0637; H04L 47/34; H04L 47/31; H04L 9/3252; H04L 45/00; H04L 2209/38
See application file for complete search history.

(56) References Cited

U.S. PATENT DOCUMENTS

| | | | |
|---|---|---|---|
| 2015/0333930 A1 | 11/2015 | Aysola et al. | |
| 2016/0014016 A1 | 1/2016 | Guichard et al. | |
| 2016/0182458 A1* | 6/2016 | Shatzkamer | H04L 63/0428 713/168 |
| 2016/0277188 A1* | 9/2016 | Quinn | H04L 9/3213 |
| 2016/0315921 A1* | 10/2016 | Dara | H04L 69/22 |

(Continued)

OTHER PUBLICATIONS

European Search Report of European Patent Application No. 16 38 2153, dated Jul. 29, 2016.

*Primary Examiner* — Michael Pyzocha
(74) *Attorney, Agent, or Firm* — Sughrue Mion, PLLC

(57) ABSTRACT

The method comprising, in a network based on a chain of individual Service Functions, SFs, that are composed to implement Network Services, NSs: assigning, at an ingress node of a network architecture, to at least one data packet received by said ingress node from the network, a unique cryptographic tag; processing said assigned unique cryptographic tag using a cryptographic function specific to each Service Function, SF; and verifying, at a given point of the network architecture, said processed unique cryptographic tag by applying a cryptographic verification function composed by the inverse functions of the cryptographic functions associated to the SFs traversed by the at least one data packet.

6 Claims, 10 Drawing Sheets

(56) References Cited

U.S. PATENT DOCUMENTS

| | | | |
|---|---|---|---|
| 2016/0366191 A1* | 12/2016 | Patil | H04L 63/166 |
| 2016/0373474 A1* | 12/2016 | Sood | H04L 63/1425 |
| 2017/0046664 A1* | 2/2017 | Haldenby | G06Q 20/0655 |
| 2017/0094002 A1* | 3/2017 | Kumar | H04L 49/70 |
| 2017/0230252 A1* | 8/2017 | Khasnabish | H04L 47/2441 |
| 2018/0308134 A1* | 10/2018 | Manning | G06Q 30/02 |

* cited by examiner

METHOD TO ASSURE CORRECT DATA PACKET TRAVERSAL THROUGH A PARTICULAR PATH OF A NETWORK

CROSS REFERENCE TO RELATED APPLICATIONS

This application claims priority based on European Patent Application No. 16382153.1, filed Apr. 7, 2016, the contents of all of which are incorporated herein by reference in their entirety.

TECHNICAL FIELD

The present invention is directed, in general, to the field of Service Function Chaining. In particular, the invention relates to a method to assure correct data packet traversal through a particular path of a network by using cryptographic procedures.

BACKGROUND OF THE INVENTION

There is a need for technological platforms more flexible and easy to develop, with the ability to support migrations from physical environments to virtual ones, and the purpose to deploy models for service functions not tightly coupled to network topology and physical resources. This way it would be possible to do away with the static nature of the current deployment models that limit the introduction of new or modify existing services and/or service functions.

To address the above issues, one possible network architecture mechanism that facilitates the definition and instantiation of an ordered set of service functions and subsequent steering of traffic through them is the Service Function Chaining (SFC) architecture [1]. Other possibilities include stitching as used in state of the art cloud platforms [2].

The SFC architecture is established on topological independence from the underlying forwarding topology. In this, as may be seen on FIG. 1, data packets are classified on the ingress node for handling by the required set of Service Functions (SFs) and are then forwarded through that ordered set of functions for processing by each function in turn. As a result of this processing the packets are perhaps reclassified.

The SFC architecture includes Service Function Forwarders (SFF), as may be seen on FIG. 2, responsible for forwarding data packets received from the network to one or more SFs associated with a given SFF. Traffic from SFs eventually returns to the same SFF, which is responsible for injecting traffic back onto the network.

The implied order may not be a linear progression as the architecture allows for SFCs to copy to more than one branch, and also allows for cases where there is flexibility in the order in which service functions are applied.

The delivery of end-to-end services often requires various SFs including traditional network SFs (for example, firewalls and server load balancers, among others), as well as application-specific features such as HTTP header manipulation. SFs may be delivered within the context of an isolated user (e.g., a tenant) or shared amongst many users or user groups.

Current deployment models for SFs are often tightly coupled to network topology and physical resources, thus resulting in relatively rigid and static deployments. The static nature of such deployments greatly reduces and, in many cases, limits the ability of an operator to introduce new or modify existing services and/or SFs. Furthermore there is a cascading effect: changing one or more elements of a SF chain often affects other elements in the chain and/or the network elements used to construct the chain.

This issue is particularly acute in elastic service environments that require relatively rapid creation, destruction, or movement of physical or virtual SFs or network elements. Additionally, the transition to virtual platforms requires an agile service insertion model that supports elastic and very granular service delivery, post facto modification, and the movement of SFs and application workloads in the existing network. The service insertion model must also retain the network and service policies and the ability to easily bind service policy to granular information such as per-subscriber state.

Non-SFC network service deployments are often coupled to network topology, whether it be physical, virtualized, or a hybrid of the two. Such dependency imposes constraints on service delivery and limits scale, capacity, and redundancy across network resources, but on the other hand allows networks operators and service users to verify the effective application of the required services to packet flows by verifying the topology.

As more service functions are required—often with strict ordering—topology changes are needed in "front" and "behind" each SF, resulting in complex network changes and device configuration. In such topologies, all traffic, whether a SF needs to be applied or not, often passes through the same strict order. But, again, this provides a strict assurance of function application.

The dynamic nature of the SFC architecture, decoupling service from topology dependencies, supports a much flexible and scalable configuration of how services are applied to packet flows, but limits the ability of an effective verification of the actual application of the required processing both to flows and individual packets. There are use cases where a strong evidence of each packet passing through a particular path in a chain is required, in particular in security-sensitive environments, and whenever high-priority policies have to be enforced. An archetypal case is network services applied in financial environments.

Since current practice for providing a strong evidence of SF application in these use cases requires physical verification of host chaining and direct topology evidence, these requirements virtually invalidate (or at least seriously limit) the application of SFC in those environments.

More technologies are therefore needed to assure the effective application of a chain of SFs to the data packets flows coming from a network to assure a given order of traversal of the SFs and to provide strong evidence that the data packets has traversed the correct path in the chain.

REFERENCES

[1] [RFC7665] J. Halpern, Ed. and C. Pignataro, Ed., "Service Function Chaining (SFC) Architecture", RFC 7665, DOI 10.17487/RFC7665, October 2015, <http://www.rfc-editor.org/info/rfc7665>.

[2] Centina Systems, "NFV and SDN Assurance; Monitor and optimize virtual networks comprehensively", http://www.centinasystems.com/solutions/nfv-and-sdn-assurance/

DESCRIPTION OF THE INVENTION

To that end, embodiments of the present invention provide a method to assure correct data packet traversal through a particular path in a network, wherein said network is based on a chain of individual Service Functions (SFs) that are composed to implement network services. The method in a characteristic manner comprises: the assignment, at an ingress node of a network architecture, to at least one data packet received by said ingress node from the network, of a unique cryptographic tag; the processing of the assigned unique cryptographic tag by means of a cryptographic function specific to each particular Service Function (SF); and the final verification, at any given point of the network architecture, preferably at an egress node thereof, of the processed unique cryptographic tag by means of applying a cryptographic verification function.

According to the proposed method, said cryptographic verification function is composed by the inverse functions of the cryptographic functions associated to the SFs traversed by the data packet(s).

According to the invention, the cryptographic functions specific to each SF that can be used may include: a Digital Signature Algorithm (DSA), a SHA256 algorithm, an Elliptic Curve Digital Signature Algorithm (ECDSA), a secp256k1 algorithm, among others. The different SFs may use the same or different cryptographic functions. That is, a given SF can use a DSA whereas the next SF in the path can use a secp256k1 algorithm, or alternatively, both SFs in the path can use the same cryptographic function.

According to a preferred embodiment, said network architecture comprises a Service Function Chain (SFC) architecture. In this particular case, said processing of the assigned unique cryptographic tag may be performed either by Service Function Forwarders (SFF) or by the SFs of the particular path when the data packet is submitted to each SF, or alternatively to each SF proxy.

According to an embodiment, the unique cryptographic tag assigned to a data packet is included in a Network Function Header (NSH) of the data packet. The NSH has a unique key that is associated with each SF. Preferably, the assignment of the unique cryptographic tag in the NSH is made taking into account a type-length-value, TLV, format.

According to an embodiment, a BlockChain platform is provided to assure the sequence of processing for the data packet(s) received from the network. In this particular case, each transaction entering the network architecture (e.g. the SFC architecture) is used to create a block of the BlockChain platform that is aggregated in the chain and replicated in a decentralized peer-to-peer architecture comprising a plurality of nodes, wherein each Service Function Path (SFP) of the network architecture comprises a node.

According to another embodiment, the unique cryptographic tag is not part of a metadata of the data packet(s) received from the network, in this case, the proposed method comprises providing a BlockChain platform separated from the service plane of the network architecture to assure the sequence of processing for data packet(s), said metadata having a key that is connected with a corresponding block of the BlockChain platform.

Therefore, present invention guarantees the correct sequence of data packet(s) processing by a service function path, and so can take advantage of the additional operative and management flexibility of the network architecture, reducing O&M complexity in advanced network service platforms. Furthermore, present invention contributes to enhance the scalability and reuse of these platforms, with respect to specific solutions based on physical models.

Besides, present invention guarantees the effective application of SFs within a path according to a specific network architecture (preferably the SFC architecture), assuring a given order of traversal of the SFs, with a level of assurance equivalent (or even higher than) a physical verification of host chaining.

In addition, present invention also enables more powerful ways of managing virtualized network service platforms with a guaranteed internal flow (or SF execution order), and it makes SFC applicable in cases where this guaranteed execution is strictly required.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 6a illustrates the particular case for a SF being SFC-aware and crypto-aware; FIG. 6b illustrates the particular case for a SF being SFC-aware and crypto-unaware; and FIG. 6c illustrates the particular case for a SF being SFC-unaware and crypto-unaware.

DETAILED DESCRIPTION OF THE INVENTION AND OF PREFERRED EMBODIMENTS

According to the invention, the following elements/entities can be used:

Service Function Chain (SFC): defines an ordered set of abstract service functions and ordering constraints that must be applied to data packets and flows selected as a result of classification. An example of an abstract service function is "a firewall".

Service Function (SF): A network function that is responsible for specific treatment of received data packets. A SF can act at various layers of a protocol stack (e.g., at the network layer or other OSI layers). As a logical component, a SF can be realized as a virtual element or be embedded in a physical network element. One or more Service Functions (SFs) can be embedded in the same network element. An SF may be SFC encapsulation aware (that is, it receives and acts on information in the SFC encapsulation) or unaware (in which case, data forwarded to the SF does not contain the SFC encapsulation). This is referred in the different figures of the invention as "SFC aware" and "SFC unaware", respectively. A SF may include: firewall, DPI, NAT, HTTP Header Enrichment function, TCP optimizer, load-balancer, IDS, IPS, etc.

SFC Encapsulation: The SFC encapsulation provides, at a minimum, SFP identification, and is used by the SFC-aware functions, such as the SFF and SFC-aware SFs. The SFC encapsulation is not used for network packet forwarding. In addition to SFP identification, the SFC encapsulation carries metadata including data-plane context information.

Network Service Header (NSH): A technique for SFC encapsulation defined by a common header encoding SFP identification and metadata using preferably the TLV format. It is defined by the IETF I-D draft-ietf-sfc-nsh.

SFC Proxy: Removes and inserts SFC encapsulation on behalf of an SFC-unaware service function. SFC proxies are logical elements.

Service Function Forwarder (SFF): A SFF is responsible for forwarding traffic to one or more connected SFs according to information carried in the SFC Encapsulation, as well as handling traffic coming back from the SF. Additionally, an SFF is responsible for delivering traffic to a classifier when needed and supported, transporting traffic to another SFF (in the same or different type of overlay), and terminating the Service Function Path (SFP).

Figure 1:
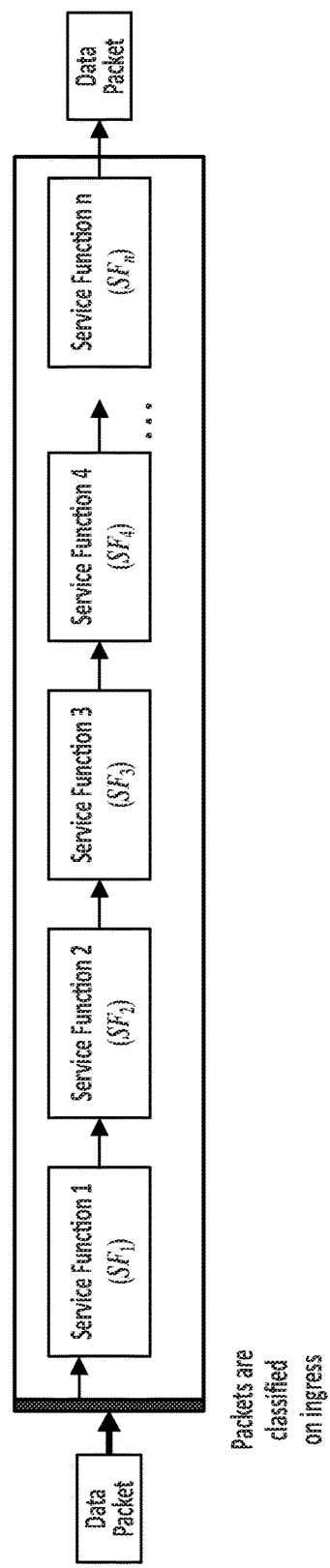
FIG. 1 illustrates the basic traffic flow for the SFC architecture.
Figure 2:
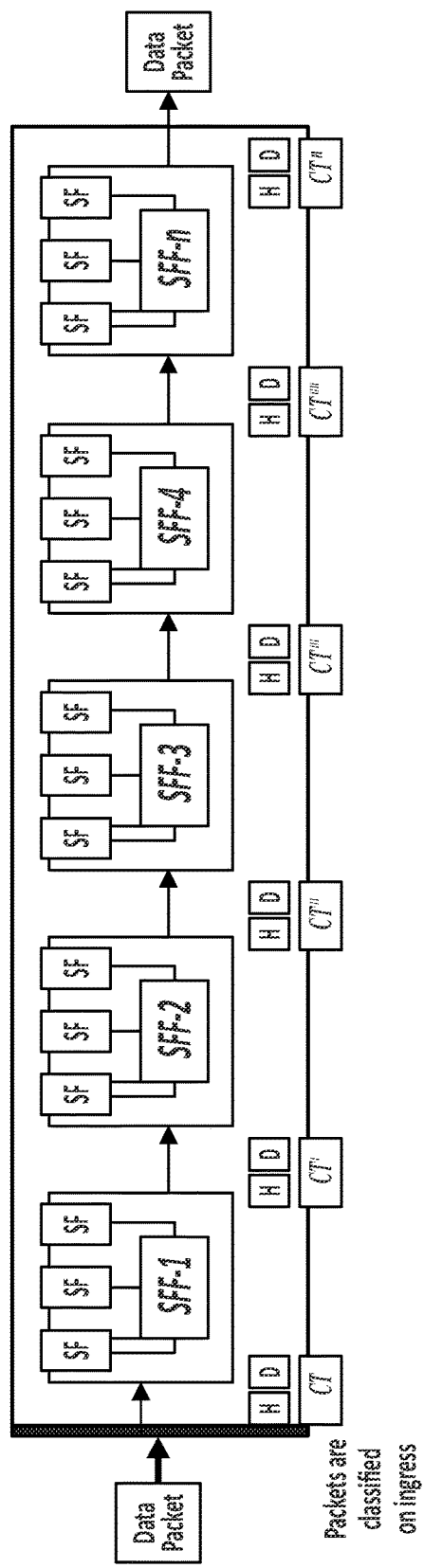
FIG. 2 illustrates the sequence of processing for data packets by SFFs.
Figure 3:
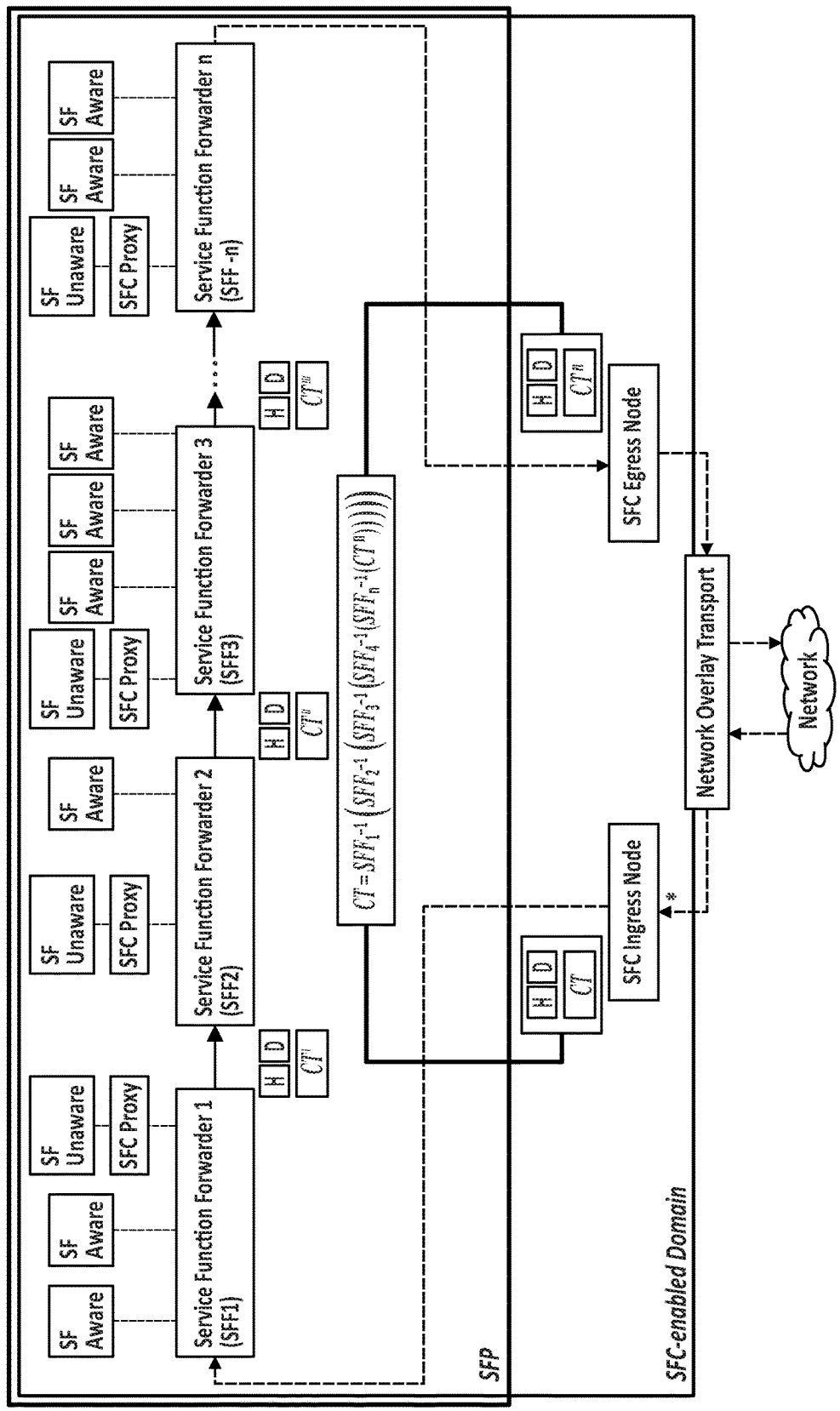
FIG. 3 illustrates a flow of a data packet in the SFC architecture to assure the sequence of processing according to a preferred embodiment of the present invention.

FIG. 3 shows a preferred embodiment of the proposed method for the particular case in which the network architecture is a Service Function Chaining (SFC) architecture. According to this preferred embodiment, first, the data packets from a network are received by an ingress node of the SFC architecture to perform initial classification, so the data packets are extended with the appropriate metadata, including the identification of the assigned Service Function Path (SFP) that these data packets have to follow. Service Function Forwarders (SFFs) are responsible to forward the received data packets to one or more Service Functions (SFs) associated to the particular SFF, applying the SFC metadata for the processed packets. Finally, the proposed method assures correct data packet traversal through that particular path in the SFC-based network service chain by applying a verification function at the end of the SFC path.

Present invention provides two options to assure the sequence of data packet processing, a first option using SFFs, and a second option using the different types of SFs and/or the corresponding Proxy (when this applies).

Figure 4:
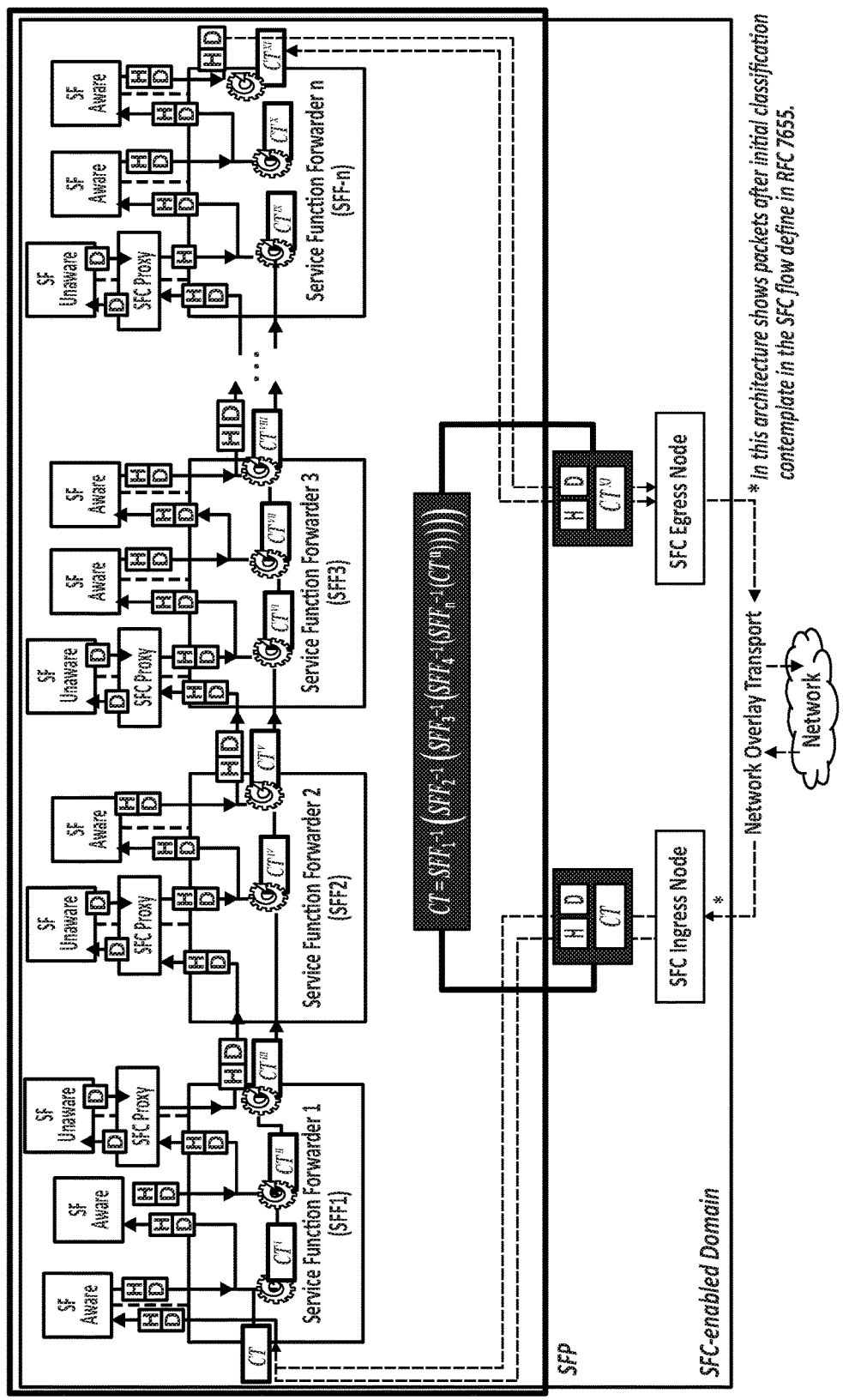
FIG. 4 illustrates a flow of a data packet in the SFC architecture with sequence assurance using SFF according to an embodiment of the present invention.

FIG. 4 illustrates an embodiment of the proposed method for assured network service chain traversal using SFFs. In the flow of data packets the proposed method assures the sequence of processing for data packets using a unique cryptographic tag, which is assigned to each data packet coming from the network at the ingress node, and that is updated (i.e. processed) by each SFF in the path when submitted to each SF (or alternatively, to each SF proxy). Preferably, the updating is made by means of a cryptographic function including but not limited to a DSA, a SHA256, an ECDSA, and/or a secp256k1. In this particular case, the path traversal is achieved by an egress node of the SFC architecture running a verification function on the unique cryptographic tag initially assigned by the ingress node. The verification function comprises the execution by said egress node of a cryptographic verification function which is the inverse function of the cryptographic function(s) previously used.

The verification function is preferably implemented at the egress of the last SF in the path. However, according to the invention, the verification process can be implemented at the egress of any SFF in the path.

Figure 5:
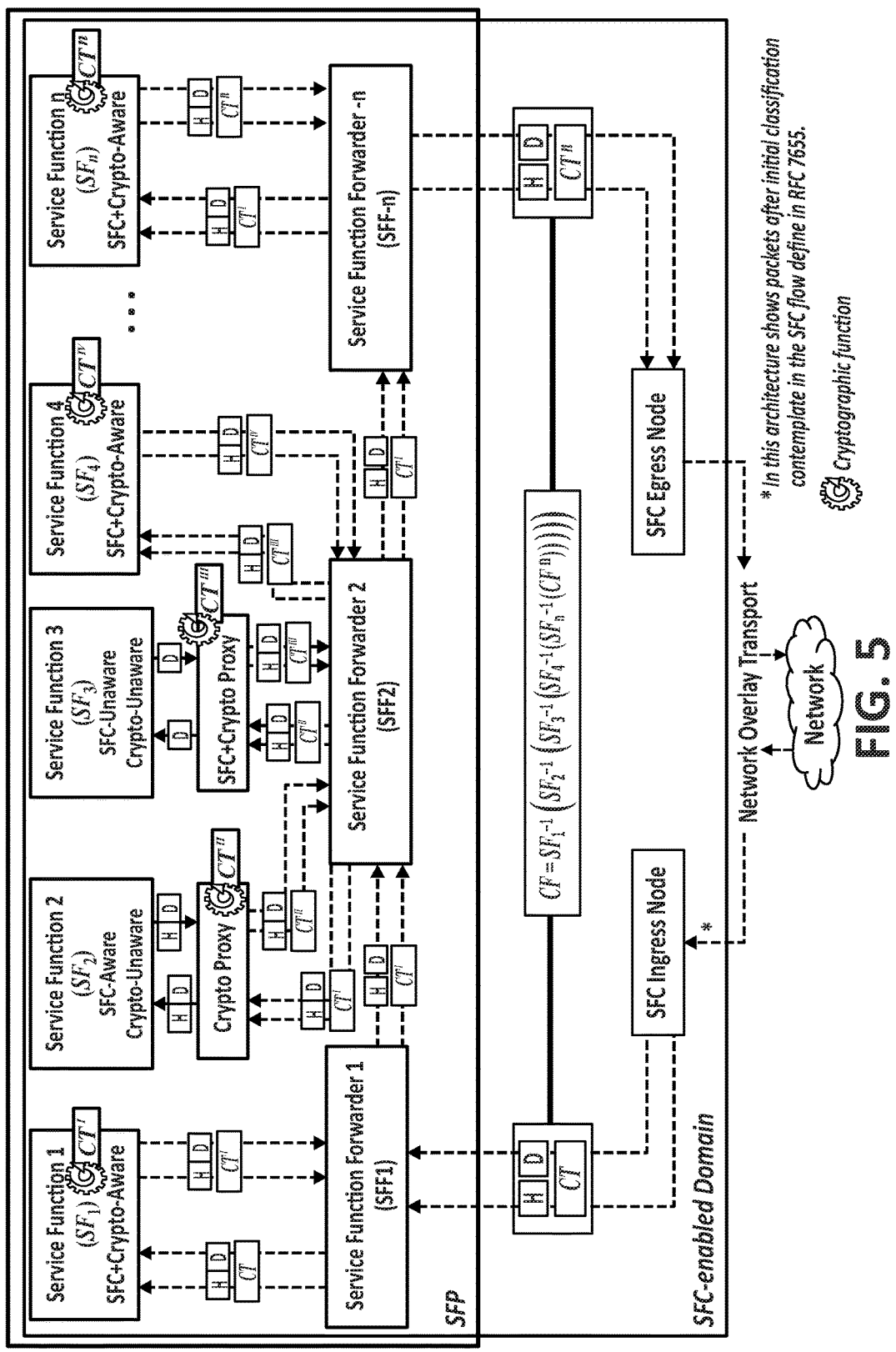
FIG. 5 illustrates a flow of a data packet in the SFC architecture with sequence assurance using SFs and/or Proxies according to an embodiment of the present invention.

FIG. 5 illustrates another embodiment of the proposed method for assured network service chain traversal using SF and/or SFC Proxy. The embodiment of FIG. 5 differs from the embodiment of FIG. 4 in that the unique cryptographic tag initially assigned at the ingress node is updated by each SF, or alternatively by a corresponding Proxy (when this applies, i.e. the SF is SFC-unaware). It has to be noted that the same flow can be present in a SFC path when more than one SFF is required.

According to the type of SF (or the respective Proxy) the processing may be as described below in FIGS. 6a-6c.

Figure 6A:
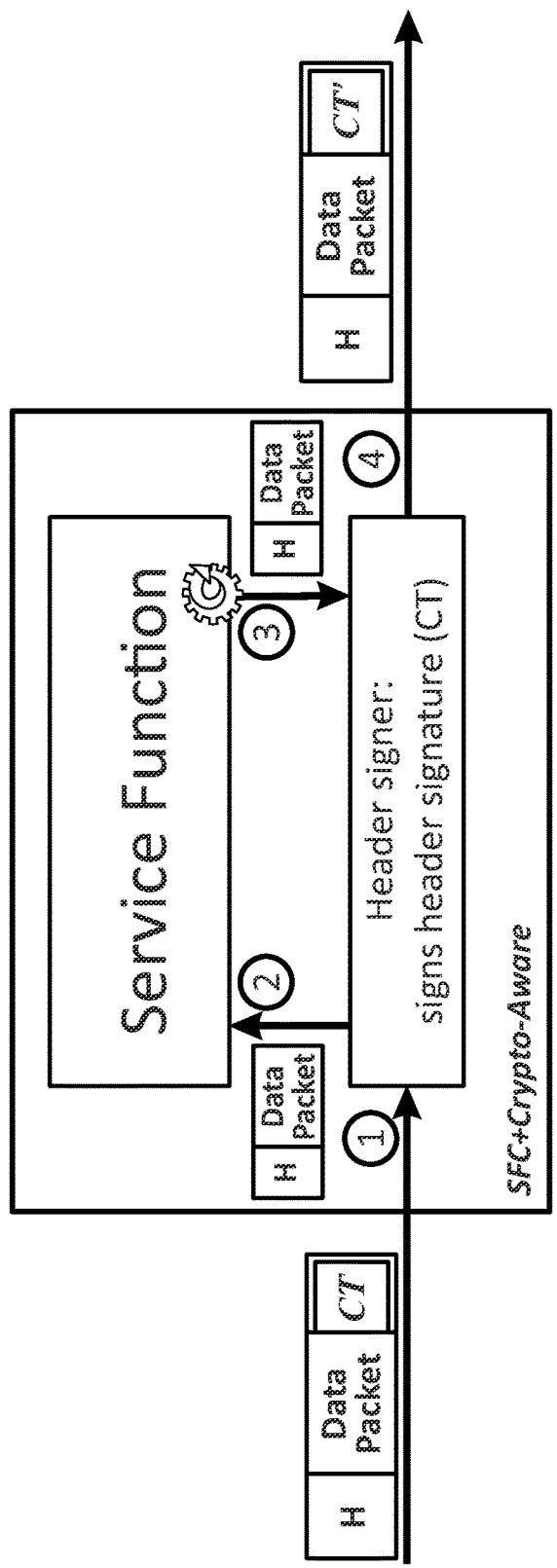
FIGS. 6a-6c illustrates the processing of the data packets of the embodiment of FIG. 5 according to the type of SF or the respective Proxy.

With reference to FIG. 6a, therein it is illustrated the processing for the case of a SF being SFC-aware and crypto-aware. In this case, the complete data packet is forwarded from the SFF to the SF, wherein it processes the unique cryptographic tag (CT in the figures) before returning the data packet to the SFF, generating a new signature (CT' in the figures) that proves that the data packet has passed through this specific SF. That is, the CT' is the unique cryptographic tag when the data packet has traversed a respective SF.

Figure 6B:
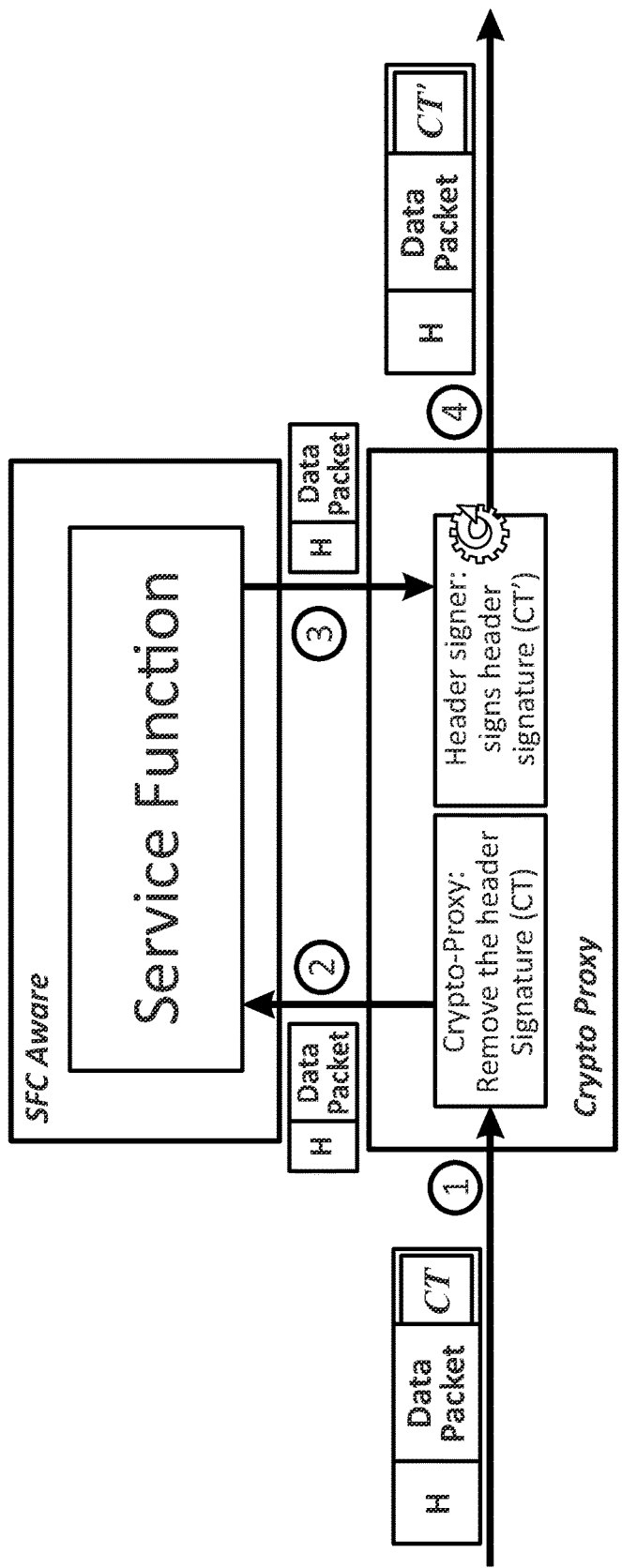

With reference to FIG. 6b, therein it is illustrated the processing for the case of a SF being SFC-aware and crypto-unaware. In this case, when the data packet is forwarded to the SF, first a Crypto-Proxy removes the assigned unique cryptographic tag, this new data packet is forwarded to the SF and then returned to the Crypto-Proxy to update (i.e. process) the assigned unique cryptographic tag, that proves that the data packet has passed through this specific SF.

Figure 6C:
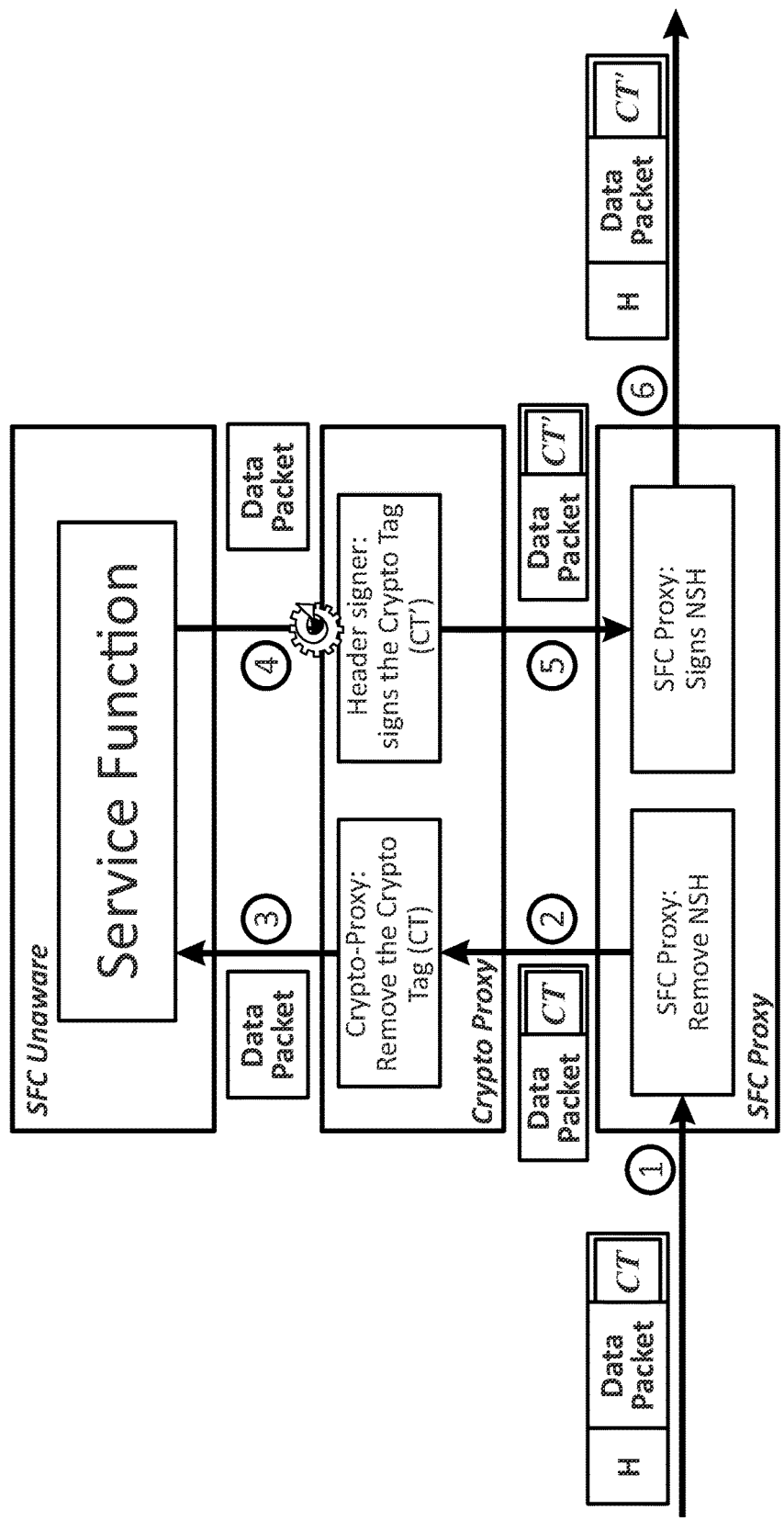

With reference to FIG. 6c, therein it is illustrated the processing for the case of a SF being SFC-unaware and crypto-unaware. In this case, the SF requires two proxies, one of them dealing with SFC metadata and the other with the assigned unique cryptographic tag, for the processing of the data packet through the SFC.

According to an embodiment, the unique cryptographic tag is assigned in the Network Service Header (NSH), (H as referred in the different figures), therefore extending the normal extension of the NSH. The cryptographic tag of each data packet is derived from the data packet content and metadata and a unique key that is associated with each SF in the path. The cryptographic tag can be implemented as a context header using the TLV format.

So, according to said embodiment, the NSH will comprise the following information:

TABLE 1

| Extended NSH | |
|---|---|
| Based Header | Provides information about the service header and the payload protocol. |
| Service Path Header | Provide path identification and location within a path. |
| Context Headers | Carry opaque metadata and variable length encoded information. |
| Crypto Tag | This is the cryptographic tag that is updated by the SFFs in the path when submitted to each SF. It can be implemented as a context header using the TLV format, for example. |

Figure 7:
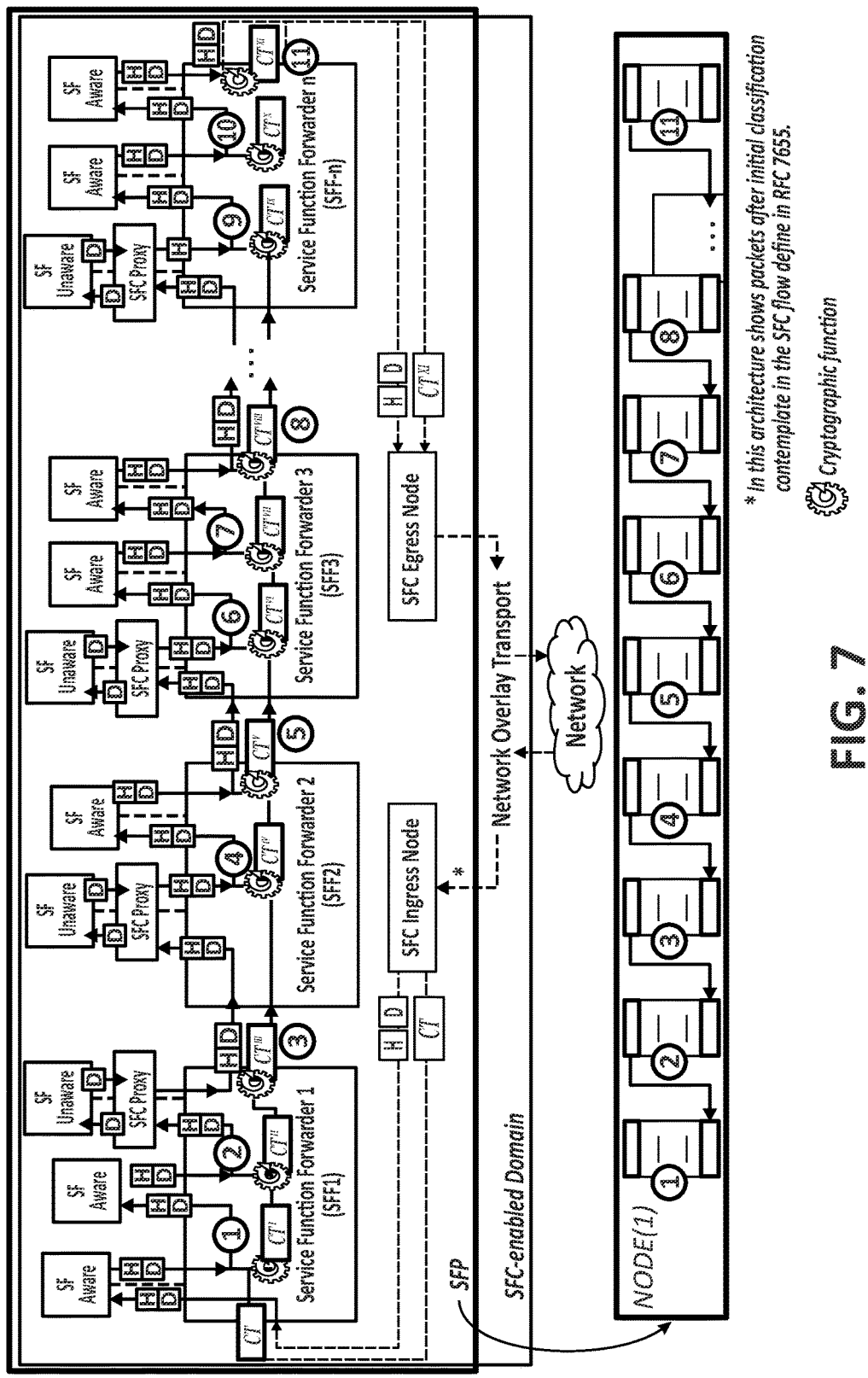
FIG. 7 illustrates an embodiment of the proposed method in which a BlockChain platform is used to assure the sequence of processing for data packets, wherein each Service Function Path (SFP) has a node containing the BlockChain platform.

With reference now to FIG. 7, this figure illustrates another embodiment of the proposed method in which a BlockChain platform is used to assure the sequence of processing for data packets. Every transaction, triggered by a data packet that enters the SFC Architecture, is used to create a block of the BlockChain platform and this consists of a header (CT), i.e. the unique cryptographic tag, that links to the preceding block and provides integrity for the BlockChain platform and a body (data packet content and metadata) which contains a record of transactions that were verified during the blocks creation.

Each block is aggregated in the chain and replicated in a decentralized peer-to-peer architecture with nodes that has associated with one SFP (it has at least one SFF and one SF), using a platform of transactional applications that establishes trust, accountability and transparency while streamlining business processes and provides a Smart contract. Transactions need to be authenticated, and cryptography is central to these processes. Protocol peers validate and commit transactions in order to reach consensus.

Figure 8:
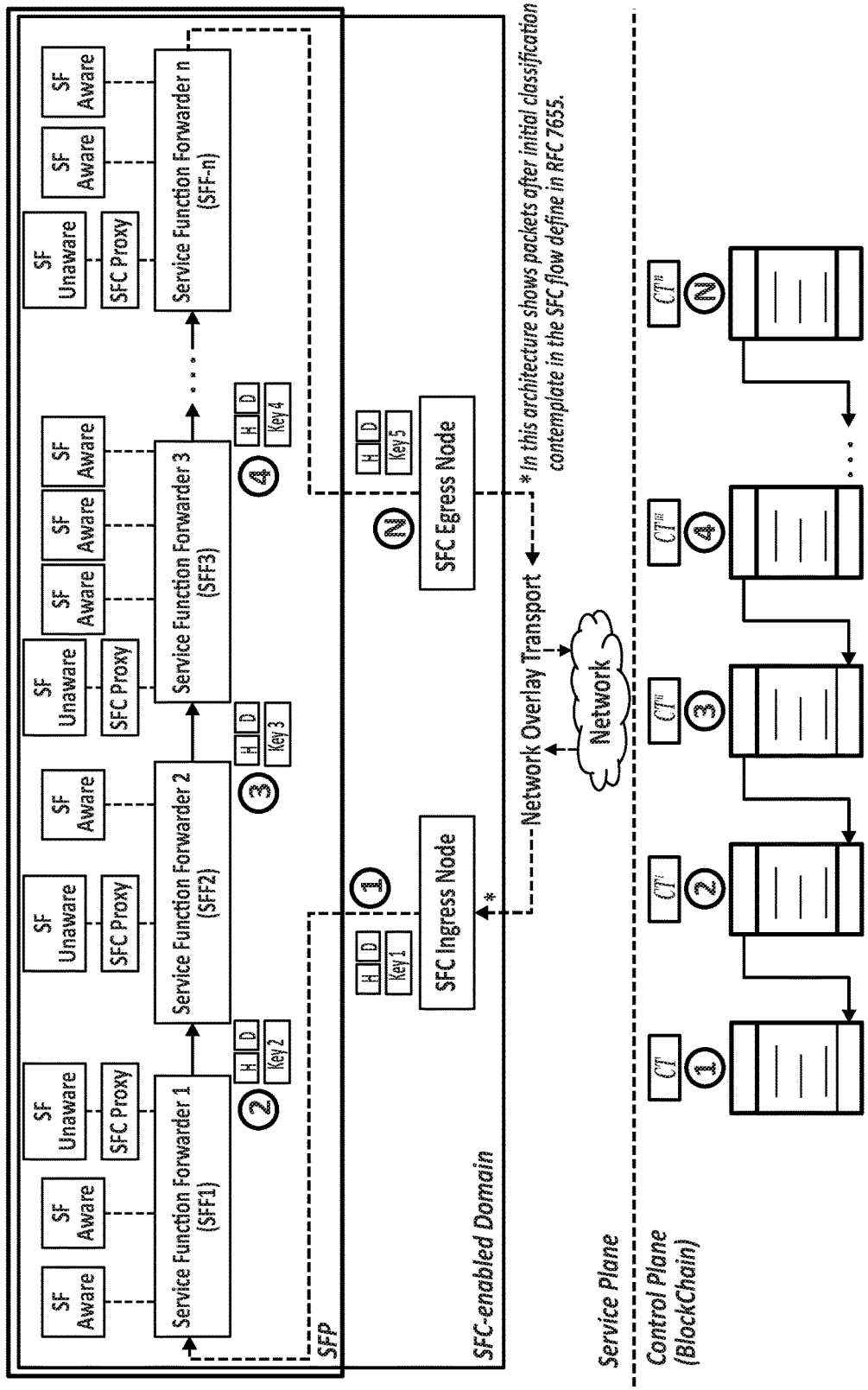
FIG. 8 illustrates an embodiment of the proposed method in which the assigned unique cryptographic tag is not part of the data packet metadata.

With reference now to FIG. 8, this figure illustrates another embodiment of the proposed method in which the assigned unique cryptographic tag is not part of the data packet metadata. A BlockChain platform separated from a service plane of the SFC architecture is provided to assure data packet processing sequence. For this scenario the data packet metadata has a key that is connected with the corresponding block.

Even though the above-embodiments have been described for the case of using a SFC architecture, the proposed method, according to alternative embodiments, in this case not illustrated, can be also implemented other network architectures such as cloud platforms.

The scope of the present invention is defined in the following set of claims.

The invention claimed is:

1. A method for assuring correct data packet traversal through a particular path of a network, wherein the network is based on a chain of individual Service Functions (SFs) that are composed to implement Network Services (NSs), the method comprising:
   assigning, at an ingress node of a network architecture, to at least one data packet received by the ingress node from the network, a unique cryptographic tag;
   processing the assigned unique cryptographic tag using a cryptographic function specific to each Service Function (SF); and
   verifying, at a given point of the network architecture, the processed unique cryptographic tag by applying a cryptographic verification function, the cryptographic verification function being composed by inverse functions of the cryptographic functions associated to the SFs traversed by the at least one data packet, wherein
   a BlockChain platform is provided to assure a sequence of processing for the at least one received data packet,
   each transaction triggered by the at least one data packet entering the network architecture is used to create a block of the BlockChain platform that is aggregated in the chain and replicated in a decentralized peer-to-peer architecture with a plurality of nodes, and
   each Service Function Path (SFP) of the network architecture comprises a node.

2. The method of claim 1, wherein the unique cryptographic tag is assigned in a Network Function Header (NSH) of the at least one received data packet, the NSH having a unique key that is associated with each SF.

3. The method of claim 2, further comprising assigning the unique cryptographic tag by taking into account a type-length-value (TLV) format.

4. The method of claim 1, wherein
   the unique cryptographic tag is not part of a metadata of the at least one received data packet,
   the BlockChain platform is separated from a service plane of the network architecture to assure the sequence of processing for the at least one received data packet, and
   the metadata of the at least one received data packet has a key that is connected with a corresponding block of the BlockChain platform.

5. The method of claim 1, wherein the given point is an egress node of the network architecture.

6. The method of claim 1, wherein the network architecture comprises a Service Function Chain (SFC) architecture.

* * * * *